Feb. 6, 1951  A. M. PHILLIPSON ET AL  2,540,344
COMBINED EDUCATIONAL DEVICE, CABINET, AND EASEL
Filed Oct. 9, 1948
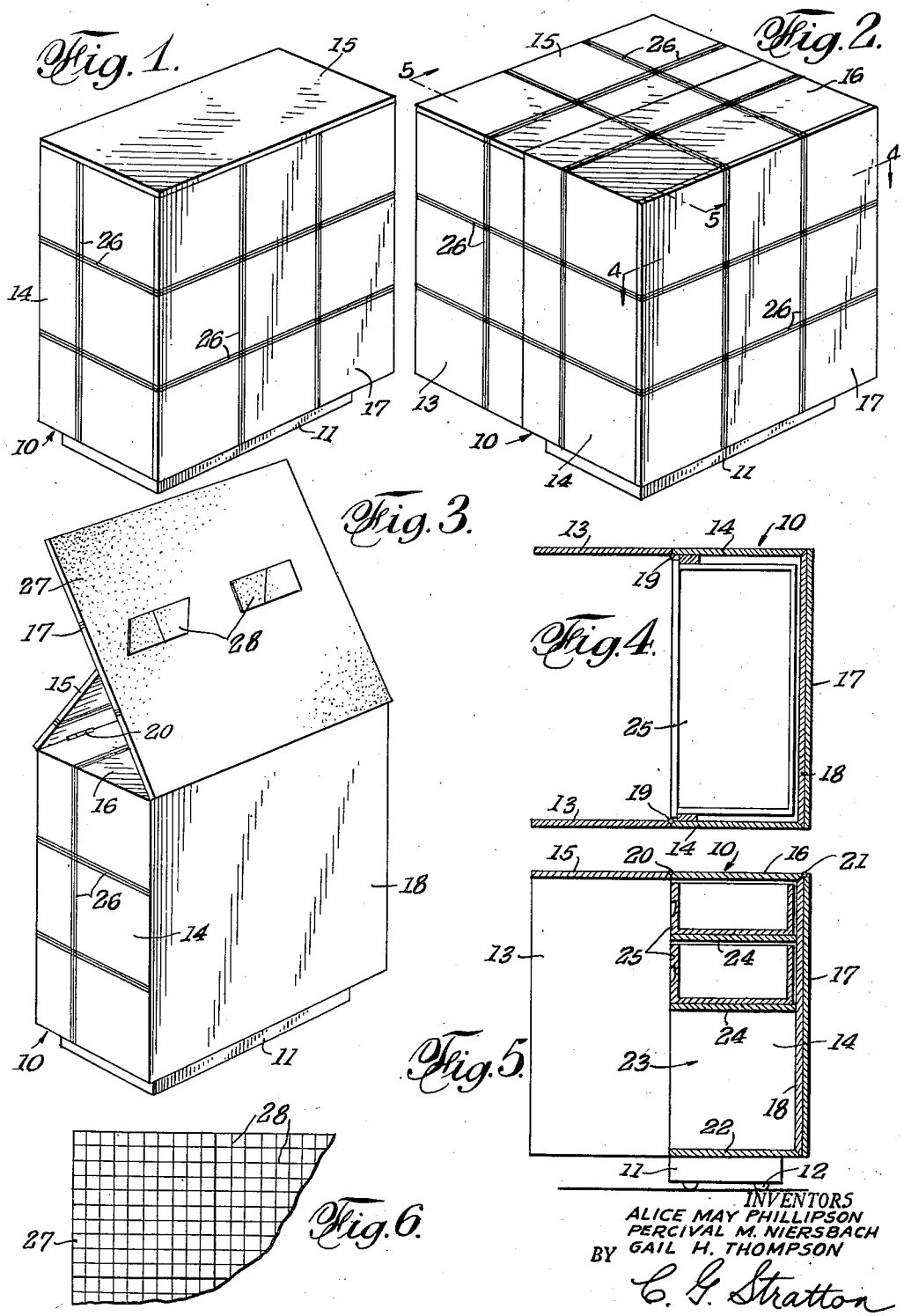
INVENTORS
ALICE MAY PHILLIPSON
PERCIVAL M. NIERSBACH
BY GAIL H. THOMPSON
C. G. Stratton
ATTORNEY Patented Feb. 6, 1951

2,540,344

UNITED STATES PATENT OFFICE 2,540,344

COMBINED EDUCATIONAL DEVICE, CABINET, AND EASEL

Alice May Phillipson, South Gate, Percival M. Niersbach, Huntington Park, and Gail H. Thompson, Los Angeles, Calif.

Application October 9, 1948, Serial No. 53,642

3 Claims. (Cl. 35—34)

1

This invention relates to an article that combines an educational device, a cabinet and an easel, and embodies novel features of construction and arrangement whereby the same may be readily and selectively arranged as an educational device for visually demonstrating the size, mass and the number of cubic feet in a cubic yard, or a comparable unit of volume as an easel for classroom use in demonstrating related problems in geometry and as a compact, substantially table-height cabinet for storing, for ready availability, the elements employed for demonstrations as above.

An object of the present invention is to provide a combined device, of the character indicated, that includes inter-related elements or components adapting said device for quick and easy conversion from one of its forms to another.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a perspective view showing the device of this invention in the compact form it assumes when arranged as a cabinet.

Fig. 2 is a similar view showing said device arranged to form a cube to visually demonstrate the characteristics of a cubical volume.

Fig. 3 is a similar view showing said device arranged as an easel.

Fig. 4 is a plan sectional view as taken on line 4—4 of Fig. 2.

Fig. 5 is a vertical sectional view as taken on line 5—5 of Fig. 2.

Fig. 6 is a fragmentary face view of an element of the device and showing an alternate form thereof.

In this application and in the appended claims, any reference made to a cubic yard and its components, is intended to include other units of volume among English measures and also metric units of volume, such as a cubic meter and its components.

Plane geometry, in the main, can be taught by blackboard demonstration and single plane models, since the subject deals with single plane figures. However, the simpler phases of solid geometry, since they deal with tri-planar objects, are not as readily demonstratable in a comparable manner. The vastly greater proportional differences between a linear inch, foot and yard, on one hand, and between a cubic inch, foot and yard, on the other, are somewhat difficult to grasp by some students, and are made easier to visualize by providing the physical counterparts for visual comparison. A physical cubic inch and a physical cubic foot are relatively small and are readily housed in any closet. A cubic yard, however, is another matter, its large size making it bulky and space-consuming. A cubic meter, of course, is still larger.

According to the present invention, a physical cubic yard is provided for classroom demonstration that, when out of use, occupies only one-half the volume of a cubic yard and is, thereby, more compact and readily stored and also adapted for use as an auxiliary table. The device is also made for conversion into an easel adapting the same to classroom use as indicated above.

The present device comprises, generally, a rigid housing 10 that is three feet high, three feet wide, and one and one-half feet deep, an optional pedestal 11 elevating said housing from the floor, casters 12 whereby said housing is easily movable along the floor, side panels 13 that comprise rear closures for the housing when the device is arranged in its closed compact form as a cabinet and comprise coplanar extensions of the side walls 14 of said housing when the device is arranged as an educational device, a top panel 15 movable between a superimposed position upon the top wall 16 of the housing to a position forming an extension thereof, and a front panel 17 movable between a position in front of the front wall 18 of the housing to an elevated position thereabove.

The side panels 13 are connected to the rear edges of side walls 14 by hinges 19; the top panel 15 is connected to the rear edge of top wall 16 by a hinge 20; and front panel 17 is connected at the edge defined by walls 16 and 18 by a hinge 21.

The housing 10 is also provided with a bottom wall 22 serving to mount pedestal 11 and the walls of said housing enclose a rearwardly open space 23 which is adapted to be provided with one or more partitions 24 that serve to define one or more housing spaces for drawers 25. Space 23 may be divided in different ways to provide storage for articles of a related nature.

When the above-described device is arranged as in Fig. 2, the device comprises a cube, each dimension of which is a yard in length and the outer surfaces thereof are provided with markings or lines 26 dividing said surfaces into one foot squares to show, visually that said one yard cube comprises twenty-seven cubic feet.

In the closed arrangement of Fig. 1, the panel 15 comprises the top of the device and panels 13, while not seen, comprise doors that enclose storage space 23. Suitable latches may hold said doors closed. The compact cabinet may thus be used as a table or may be tucked away against a wall since its depth dimension is only one and one-half feet.

In the arrangement of Figs. 2, 3 and 4, the side panels 13 are swung out to align with the respective walls 14 so that sides of the same width as front wall 17, are formed, and the top panel 15 is also swung out to rest upon the upper edges of panels 13 to form a top of the same depth as the width of said front wall, a cube, thereby being formed for the purposes above outlined. It should be understood that suitable stops, such as movement-limiting chains, may be provided to limit the outward movement of panels 13.

In the arrangement of Fig. 3, the panel 17 is swung up and then to the rear, as shown, and the panel 15 employed as a prop to support the rearwardly angled panel 17 in the manner of an easel. It will be noted that the initially inner surface 27 of the latter panel is now exposed and the same may be variously treated. As in Fig. 3, surface 27 is coated or lined with a flocculent material that is especially formed with fine upstanding fibers that comprise a nap, the fibers of which interlace with similar fibers of a like material lining one or both sides of articles such as shown at 28. Such articles may visually demonstrate geometrical problems. By simply placing the components of such articles on surface 27, assurance is had that the same will "stick" in position even when said surface closely approaches vertical. The articles are removed by a simple lift, said surface 27 being unaffected as it would be if adhesives or pins were used. Besides, the work of the teacher is rendered easier by the facility with which these articles can be applied and removed.

Another form of treatment for surface 27 is shown in Fig. 6 wherein a slate or blackboard surface is provided and chart or graph ordinate and abscissa lines placed thereon substantially as shown at 28.

The panel 15—the one having markings 26 thereon—may be employed as an easel by supporting the same in an angular position similar to that of panel 17. The initial under surface of panel 15 may be provided with a flocculent cover or lining similar to that on surface 27 to adapt panel 15 for such use.

Thus, the present device comprises a convertible device embodying elements that are so interrelated that they co-act to selectively provide the three forms of the device above described.

While the invention that has been illustrated and described is now regarded as the preferred embodiment the construction is, of course, subject to modifications without departing from the spirit and scope of the invention. It is therefore not desired to restrict the invention to the particular form of construction illustrated and described, but to cover all modifications that may fall within the scope of the appended claims.

Having thus described our invention, what we claim and desire to secure by Letters Patent is:

1. A combined educational device of the character described comprising a hollow housing having a square front wall and similar side and top rectangular walls, a top panel foldable between a position superimposed on the top wall and a position forming an extension thereof, side panels foldable between a position enclosing the hollow of the housing and a position forming an extension of the side walls, the latter panels, when extended, supporting the top panel when extended, and a panel forward of the front wall of the housing and foldable between a position covering said front wall and a position forming an upper rearwardly sloped extension of said front wall.

2. A combined educational device of the character described comprising a hollow housing having a square front wall and similar side and top rectangular walls, a top panel foldable between a position superimposed on the top wall and a position forming an extension thereof, side panels foldable between a position enclosing the hollow of the housing and a position forming an extension of the side walls, the latter panels, when extended, supporting the top panel when extended, and a panel forward of the front wall of the housing and foldable between a position covering said front wall and a position forming an upper rearwardly sloped extension of said front wall, said top panel being adapted also to be placed in an intermediate position to comprise a prop supporting said rearwardly sloped extension of the front wall.

3. A combined educational device of the character described comprising a hollow housing having a square front wall and similar side and top rectangular walls, a top panel foldable between a position superimposed on the top wall and a position forming an extension thereof, side panels foldable between a position enclosing the hollow of the housing and a position forming an extension of the side walls, the latter panels, when extended, supporting the top panel when extended, a panel forward of the front wall of the housing and foldable between a position covering said front wall and a position forming an upper rearwardly sloped extension of said front wall, said top panel being adapted also to be placed in an intermediate position to comprise a prop supporting said rearwardly sloped extension of the front wall, a flocculent cover for the initially inner surface of said front panel for receiving and holding similarly covered articles, when said front panel is in the extended sloping position.

ALICE MAY PHILLIPSON.
PERCIVAL M. NIERSBACH.
GAIL H. THOMPSON.

REFERENCES CITED

The following references are of record in the file of this patent:

UNITED STATES PATENTS

| Number | Name | Date |
|---|---|---|
| 209,385 | Davis | Oct. 29, 1878 |
| 508,298 | Fulton | Nov. 7, 1893 |
| 516,005 | Geer | Mar. 6, 1894 |
| 553,533 | Lord | Jan. 28, 1896 |
| 1,142,651 | Winiecki | June 8, 1915 |
| 1,155,523 | Smith | Oct. 5, 1915 |
| 1,257,655 | Walden | Feb. 26, 1918 |
| 1,627,211 | Stewart | May 3, 1927 |

FOREIGN PATENTS

| Number | Country | Date |
|---|---|---|
| 602,231 | Germany | Dec. 22, 1931 |